United States Patent
Galmes et al.

(10) Patent No.: US 9,746,805 B2
(45) Date of Patent: Aug. 29, 2017

(54) PRINTING SYSTEM

(71) Applicant: Hewlett-Packard Development Company, L.P., Houston, TX (US)

(72) Inventors: Jose M. Galmes, San Diego, CA (US); Cesar Fernandez, San Diego, CA (US); Richard W. Riper, Sweet Home, OR (US); Carlos Millan-Lorman, Corvallis, OR (US); Bruce A. Stephens, Corvallis, OR (US); Jonathan Lee Brown, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 13/907,313

(22) Filed: May 31, 2013

(65) Prior Publication Data
US 2014/0355042 A1 Dec. 4, 2014

(51) Int. Cl.
*G03G 15/00* (2006.01)
*G06F 3/12* (2006.01)

(52) U.S. Cl.
CPC ....... *G03G 15/5087* (2013.01); *G06F 3/1217* (2013.01); *G06F 3/1219* (2013.01); *G06F 3/1264* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 5,510,896 A * | 4/1996 | Wafler | H04N 1/00002 358/296 |
| 6,260,457 B1 | 7/2001 | Hakkaku | |
| 6,354,214 B1 | 3/2002 | Tokiwa | |
| 6,850,719 B2 | 2/2005 | Nagaya | |
| 2004/0264808 A1* | 12/2004 | Chun | B41J 2/2132 382/294 |
| 2005/0214017 A1* | 9/2005 | Isobe | B41J 13/106 399/82 |
| 2007/0229903 A1* | 10/2007 | Sato | G06F 3/1208 358/1.18 |
| 2007/0263238 A1* | 11/2007 | Lieberman | H04N 1/00002 358/1.9 |
| 2009/0141301 A1 | 6/2009 | Cornelissen et al. | |
| 2010/0039665 A1* | 2/2010 | Tsukada | B41J 11/66 358/1.15 |
| 2012/0319344 A1* | 12/2012 | Nakamichi | B65H 29/52 270/58.07 |

(Continued)

OTHER PUBLICATIONS

"Enhanced Finishing Options and Streamlined User Interface Make Xerox's Production Printers More Productive," Xerox Corporation, May 13, 2008, pp. 1-2, Digital Publishing Solutions, Rockport Custom Publishing, LLC, Available at: <http://www.dpsmagazine.com/Content/ContentCT.asp?P=791&cmpyNm=Xerox%20Corporation>.

*Primary Examiner* — Hilina K Demeter
(74) *Attorney, Agent, or Firm* — HP Inc. Patent Department

(57) ABSTRACT

An example method for operating a printing system in accordance with aspects of the present disclosure includes receiving, at a printing unit, a print job, receiving, at the printing unit, a trigger generated by a finishing unit, and initiating the print job based on the generated trigger.

18 Claims, 3 Drawing Sheets

(56) References Cited

U.S. PATENT DOCUMENTS

2013/0174703 A1\* 7/2013 Maenishi ............... B26D 7/015
83/72
2014/0146329 A1\* 5/2014 Mizes ................... B41J 11/008
358/1.5

\* cited by examiner

PRINTING SYSTEM

BACKGROUND

A printing device may have one or more finishing devices connected to it. The printing device comprises an output unit for outputting a printed image to the finishing device when the finishing device is arranged at the printing device. When the printing device and the finishing device share a portion of a common media path, there can a mechanism (e.g. a conveyor belt) between the printing device and the finishing device. A finishing device may be used to perform a post-printing operation, such as stacking, stapling, inserting, cutting, folding, booklet making and/or punching a pattern. For example, media may be fed directly from the printing device to an inline finishing device. After printing, the pages pass through a finishing device connected to the printing device. The finishing device processes the printed pages and may perform one or multiple finishing operations on a page. For example, the finishing device may collate the printed pages into separate groups and then staple each group together, may stack pages, etc.

BRIEF DESCRIPTION OF THE DRAWINGS

Example implementations are described in the following detailed description and in reference to the drawings, in which.

DETAILED DESCRIPTION

Figure 1:
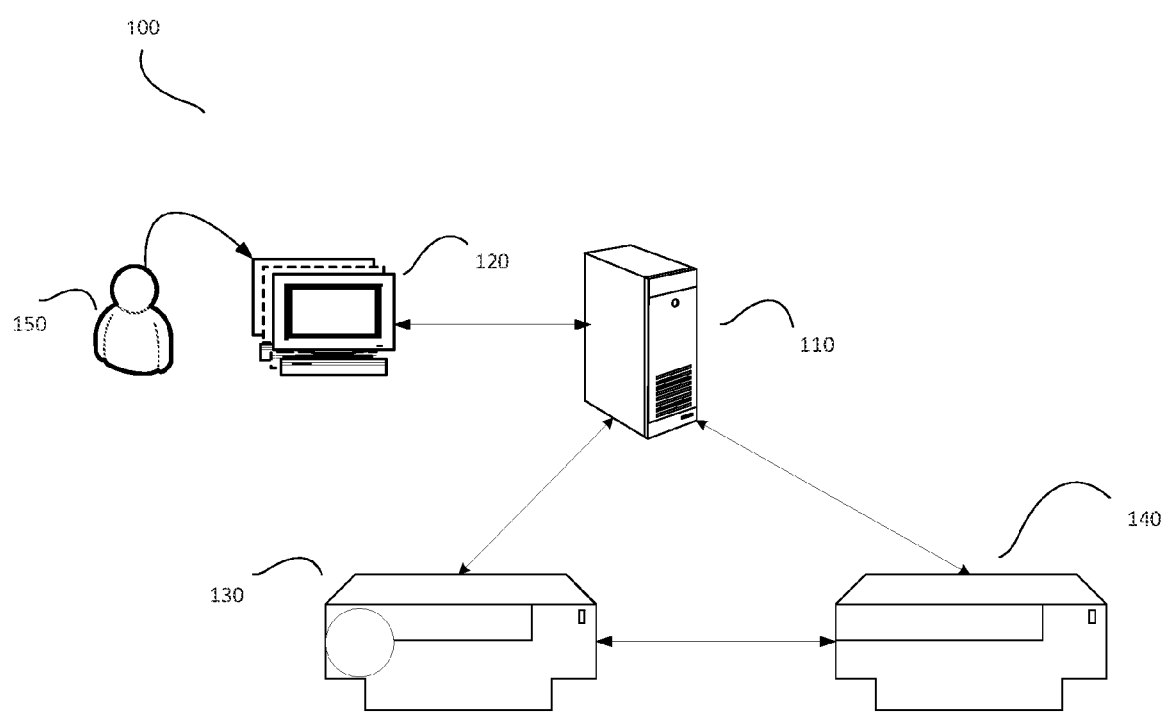
FIG. 1 illustrates an example system in accordance with an implementation.

Various implementations described herein are directed to printing. More specifically, and as described in greater detail below, various aspects of the present disclosure are directed to a manner by which a printing system with in-line finishing performs printing jobs.

Aspects of the present disclosure described herein proceed with a print job submitted by a user if a trigger generated by a finishing device is received at the print job.

While processing a print job, the printing device and the finishing device may need to be synchronized for the finishing operation to be completed accurately (e.g., the printed images are aligned correctly in the finishing device's cycle as they arrive at the finishing device). Some printing devices physically mark pages to signal to a finishing device when to operate to complete the finishing operation requested in a print job. More specifically, a print job may instruct the finishing device to fold the printed sheets along a specific line on the pages. Accordingly, the pages may be marked to indicate to the finishing device where the specific line is located. This may be achieved, for example, by providing a barcode on the printed sheets. A controller may be adapted to use synchronization markings (e.g. detected by one or more optical detectors placed in-line) made on a printed page for proper operation.

However, some finishing devices may not be able to recognize marks. A finishing device may not have the ability to read any marks on the pages and therefore may not be able to adjust frame to frame to align the finishing device exactly on a specific line. A finishing device may be configured to operate on a fixed frame length. In another example, a finishing device may be able to adjust the alignment of the printed images frame to frame by reading the marks on the pages, but the adjustment may be limited to up to a certain measurement (e.g., fractions of an inch), and accordingly, the adjustment may occur very slowly.

Accordingly, the finishing device may take a long time to reach synchronization. According to various aspects of the present disclosure, the approach described herein allows a finishing device to generate a trigger to instruct a printing device to initiate printing at an exact time (and accordingly at an exact point on the printed paper). Among other things, this approach may prevent waste paper, increase security of the content being printed by avoiding such content disclosed on waste paper, decrease the amount of time needed to complete a print job, and reduce costs associated with printing.

In one example in accordance with the present disclosure, a method for operating a printing system is provided. The method comprises receiving, at a printing unit, a print job, receiving, at the printing unit, a trigger generated by a finishing unit, and initiating the print job based on the generated trigger.

In another example in accordance with the present disclosure, a printing system is provided. The printing system comprises a printing unit to receive a print job, and a controller to control input data generated in response to a trigger from a finishing unit. The finishing unit is communicatively coupled to the printing unit. The trigger initiates the print job at the printing unit.

In a further example in accordance with the present disclosure, a printing system is provided. The printing system comprises a printing unit to receive a print job. The printing unit receives a trigger generated by a finishing unit within a predetermined amount of time and initiates the print job based on the generated trigger FIG. 1 illustrates an example printing system 100 in accordance with an implementation. The system 100 comprises a computer 110 with a user interface 120, a printing device 130, and a finishing device 140, each of which is described in greater detail below. It should be readily apparent that the system 100 depicted in FIG. 1 represents a generalized illustration and that other components may be added or existing components may be removed, modified, or rearranged without departing from a scope of the present disclosure. For example, while the system 100 illustrated in FIG. 1 includes only one user interface 120, the system may actually comprise a plurality of user interfaces, and only one has been shown and described for simplicity.

In one implementation, the printing system 100 may be a web-fed printing system. In another implementation, the printing system 100 may be a digital web printing system comprising a digital press with a web feed. The computer 110 may be a user device. It should be noted that the computer 110 is intended to be representative of a broad category of data processors. The computer 110 may include a processor and memory and help translate input received by a keyboard. In one implementation, the computer 110 may include any type of processor, memory or display. Additionally, the elements of the computer 110 may communicate via a bus, network or other wired or wireless interconnection.

The computer 110 comprises a processor, and a machine readable medium encoded with instructions, each of which is described in greater detail below. The components of the computer may be connected via buses. The computer 110 may be any of a variety of computing devices, such as a workstation computer, a desktop computer, a laptop computer, a tablet or slate computer, a server computer, or a smart phone, among others. More specifically, as non-limiting examples, the computer 110 may be configured as any type of personal computer, portable computer, workstation, personal digital assistant, video game player, communication device (including wireless phones and messaging devices), media device, including recorders and players (including televisions, cable boxes, music players, and video players) or other device capable of sending a print request to the printing device.

The processor may comprise at least one high-speed data processor adequate to execute program components for executing user and/or system-generated requests. The processor may retrieve and execute instructions stored in the machine readable medium. The processor may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor may fetch, decode, and execute instructions stored on the machine readable medium to operate the computer 110 in accordance with the above-described examples. The machine readable medium may be a non-transitory computer-readable medium that stores machine readable instructions, codes, data, and/or other information. The instructions, when executed by a processor (e.g., via one processing element or multiple processing elements of the processor) can cause the processor to perform processes described herein.

In certain implementations, the machine readable medium may be integrated with the processor, while in other implementations, the machine readable medium and the processor may be discrete units.

Further, the computer readable medium may participate in providing instructions to the processor for execution. The machine readable medium may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

In one implementation, the machine readable medium may have print job databases. These databases may store data such as print job request IDs, the names of documents to be printed, and the time of the printing request and/or the like.

As discussed in more detail above, the processor may be in data communication with the machine readable medium, which may include a combination of temporary and/or permanent storage. The machine readable medium may include program memory that includes all programs and software such as an operating system, user detection software component, and any other application software programs. The machine readable medium may also include data memory that may include system settings, a record of user options and preferences, and any other data required by any element of the computer 110. The computer readable medium may include program memory that includes all programs and software such as an operating system, user detection software component, and any other application software programs. The computer readable medium may also include data memory that may include system settings, a record of user options and preferences, and any other data required by any element of the computer 110.

In one implementation, the machine readable storage medium (media) may have instructions stored thereon/in which can be used to program the computer 110 to perform any of the processes of the implementations described herein. For example, one type of instructions may be receiving instructions. The receiving instructions can cause the processor to receive data regarding a printing request from the user 150. The printing request may include the user ID, the name of the document, the specifics of the print job (e.g., number of copies, operations for the finishing device).

In another implementation, the processor may receive data from the printing device 130 and/or the finishing device 140. For example, after an instruction to proceed with a print job received from a user of the system 100, the printing device may issue an error for a plurality of reasons (e.g. time out, missing trigger from the finishing device). In response to the error received from the printing device, the processor may instruct to display an alert on the user interface 120 to inform the user 150 about the existing error.

In one implementation, the user interface 120 may be a display of the computer 110. The user interface 120 may refer to the graphical, textual and auditory information a computer program may present to the user 150, and the control sequences (such as keystrokes with the computer keyboard) the user 150 may employ to control the program. In one example system, the user interface 120 may present various pages that represent applications available to the user 150. The user interface 120 may facilitate interactions between the user 150 and computer system 100 by inviting and responding to user input and translating tasks and results to a language or image that the user 150 can understand. In another implementation, the computer 110 may receive input from a plurality of input devices, such as a keyboard, mouse, touch device or verbal command.

As explained above in more detail, in some implementations, the user 150 may interact with the system 100 through the user interface 120 by controlling a keyboard, which may be an input device for the computer 110. The user 150 may perform various gestures on the keyboard. Such gestures may involve, but not limited to, touching, pressing, waiving, placing an object in proximity.

In other implementation, the user 150 may interact with the system 100 by controlling operation panels for the printing device 130 and/or the finishing device 140. More specifically, the user 150 may operate an operation panel associated with the devices to specify a web size, a finishing method, etc. to execute the finishing operation. The operation panel may comprise an information input key used to input information on finishing operations such as the size of printing to be finished and a finishing mode, a finishing execution key used to start the finishing process, and a position fine-tuning key used to fine-tune the positions of the web.

In one implementation, the user 150 may choose to press at least one key on the keyboard to request a print job to be processed by the printing system 100. In response to detected pressing, the printing system may initiate the print job. For example, a printer driver program installed in and executed by the computer 110 may be used. The printer driver program may be read from a floppy disk or a CD-ROM and then installed in the computer 110 or may be downloaded from a server via the Internet or the like and then installed in the computer 110. When the printer driver program installed in the computer 100 is activated, a printer driver screen may be displayed on the user interface 120.

The printing device 130 may be a printing assembly, such as, a web fed press, for example a digital press, which outputs web of a single print job (or of multiple print jobs). The printing device 130 and the finishing device 140 may have a smart interface for connecting the printing device 130 and the finishing device 140, thereby extending the control of the printing device 130 to the finishing device 140. The printing device 130 may receive a print job.

In one example, the finishing device 140 is a separate module that is coupled to the printing device 130. The finishing device 140 may be a device to perform finishing operations. For example, the finishing device may be a unit for cutting and folding a printed web into predetermined printing images. The finishing device 140 may be designed to carry out one or more finishing actions, such as, for example, scoring, cutting, slitting, trimming, folding and binding. Examples of types of finishing devices may include a folder, a booklet maker, a wire binder, a book binder, a top feed, and/or alike.

The finishing device 140 may be mechanically attached to the printing device 130 in order to receive the printed materials from the printing device 130. The finishing device 140 may also be electrically connected to the printing device 130 in order to receive instructions for performing the finishing operations from the printing device 130. In one example the finishing device 140 may perform only one finishing operation. For example, the finishing device 140 may only staple the print job that it receives from the printing device 130. In another example, the finishing device 140 may be capable of performing more than one finishing operation. For example, the finishing device 140 may both staple and stack the print job that it receives from the printing device 130. Further, the finishing device 140 may perform one set of finishing operations but, optionally, may perform another set of finishing operations at the direction of the user 150 or the printing device 130. For example, the finishing device 140 may stack print jobs that it receives from the printing device 130, but may optionally staple the print job or not staple the print job.

The finishing operations may be engaged or disengaged either mechanically, electrically, or both by the printing device 130. For example, the user 150 may connect the finishing device 140 to the printing device 130 by mechanically attaching the finishing device 140 to the printing device 130. The user 150 may align and mate the two devices in such a manner that the finishing device 140 is capable of receiving a print job from the printing device 130. Additionally, the user 150 may electrically connect the printing device 130 and the finishing device 140 to supply power to the finishing device 140, send and receive electrical signals that activate or deactivate the finishing operation, or indicate when errors occur during the finishing of the print job. Not only may communication between the printing device 130 and the finishing device 140 may occur through the electrical connection, but communication may also occur through an optical connection, such as a fiber optic cable or infrared beam, or through a wireless connection, such as the Bluetooth wireless connection, familiar to those of ordinary skill in the art.

In one implementation, the printing device may receive a print job, for example, from the computer 110 via the user 150. In one implementation, the finishing unit 140 may receive a notice of the print job, and this may initiate the transmission of a trigger to the printing device 130. The printing device 130 may not initiate the print job until a trigger is received from the finishing device 140. The trigger is to initiate the print job, and accordingly, the printing device starts the print job only when the trigger is received from the finishing device 140. In another implementation, the receipt of the print job may not be communicated to the finishing device 140. In one implementation, the printing device 130 may wait for a set amount of time to receive a trigger from the finishing device 140. Such amount of time may be set and calibrated to assure alignment of the pages being processed by the printing device 130 as they are received at the finishing device 140. For example, the finishing unit 140 may generate a cyclic trigger (e.g., cyclically recurring signal) for each page to be printed by the printing device 130. Moreover, the timing of the trigger may need to be calibrated based on a cycle of the finishing device 140. The timing of the trigger may be calibrated to align the image printed by the printing device 130 in the finishing device's cycle when received at the finishing device 140. The cycle of the finishing device may be defined as one loop of at least one finishing operation that the finishing device 140 performs based on the finishing operations indicated in the print job.

The printing device 130 and the finishing device 140 may be placed a set distance from one another. For example, the distance between two devices may be set to 26 feet. In one implementation, if the distance is changed, the timing of the trigger generated by the finishing unit 140 may need to be adjusted accordingly to maintain the alignment of the printed images from the printing unit 130 when arriving at the finishing unit 140.

In one implementation, the printing device 130 may need to use a conversion module to receive an electrical signal from the finishing device 140. Conversion modules may be available by the vendor of the printing device 130 or the finishing device 140. For example, the finishing device 140 may generate a specific signal and send it to the printing device 130 to initiate the print job requested by the user 150. Such electrical signal may act as a trigger to alert the printing device 130 to proceed with the printing and may only be communicated if the proper conversion module exists in the printing system 100. It should be noted that the printing system 100 may achieve high precision using the electrical signal as such real-time trigger provides real-time communication and interaction between devices in the printing system 100.

The printing device 130 may be controlled by a controller, which will be explained in more detail below in reference to FIG. 2. The controller may receive information, via a communication line from the finishing device 140, for example, indicating whether the finishing device 140 is on-line or off-line. For example, if the finishing device 140 is off-line, upon receiving information from the finishing device 140 indicating that the finishing device 140 is off-line, the controller may indicate on the user interface 120 or on the operation panel of the printing device 130 that the finishing device 140 is off-line. The controller of the printing device 130 may then notify the computer 110 that the finishing device 140 is off-line, and that no images can be processed. Notified of this, the controller of the printing device 130 may accept a spool of a print job from the computer 110 and reserve the start instruction given to the printing device 130.

In another implementation, the finishing device 140 may be on-line, and the print job may be started. However, during the finishing process, an error may occur at the finishing device 140. This error may be signaled to the printing device 130 in order to interrupt the current printing and initiate a recovery process. A communication module may be configured to output an error message to the user 150 of the printing device 130. Further, the controller may control, when an error signal is received from the finishing device 140, and initiate a finisher error recovery procedure.

In one implementation, the printing device 130 may connect to an additional finishing device. The attributes related to the printing device 130 may typically be included in software released by the vendor of the printing device 130. Adding another finishing device to the printing device 130 whose attributes are not stored in the memory, however, may require the vendor to write, debug, and distribute a new software release to support the added finishing device.

Figure 2:
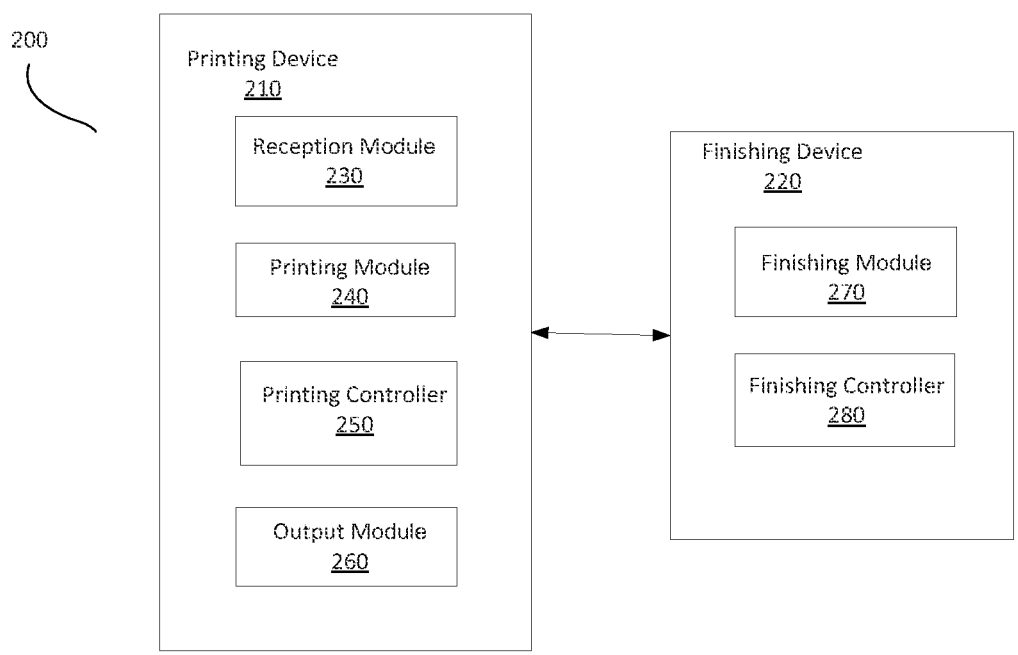
FIG. 2 illustrates an example block diagram of an example system in accordance with an implementation.

FIG. 2 illustrates an example block diagram illustrating aspects of a printing system 200 in accordance with an implementation. More specifically, FIG. 2 shows the printing system 200 comprising a printing device 210 and a finishing device 220. It should be readily apparent that the printing system 200 illustrated in FIG. 2 represents a generalized depiction and that other components may be added or existing components may be removed, modified, or rearranged without departing from a scope of the present disclosure.

The printing device 210 comprises a print job reception module 230 that receives a print job from the computer 110 that sends print jobs containing print data and at least one finishing operation command (e.g., cutting). The printing device 210 comprises a printing module 240 that prints on a print medium based on the print data contained in the print job. Moreover, the printing device 210 comprises a printing controller 250 to control the communication between the printing device 210 and the finishing device 220 in addition to the computer (e.g., the computer 110 as shown in FIG. 1). Further, the printing device 210 comprises an output module 260 for outputting a printed image-receiving web to the finishing device 220.

In one implementation, an interface may be configured for the printing device 210 to connect to the finishing device 220. The finishing device 220 comprises a finishing module 270 that implements the operations defined in the print job. For example, the finishing module 270 may cut the print medium. In one implementation, the finishing module 270 may have a plurality of cutting patterns. If the print job includes a cutting operation including a plurality of types of cutting operations corresponding to the plurality of cutting patterns, the finishing module 270 may proceed with the cutting operation. More specifically, the finishing module 270 may cut a printed roll of paper and cut the roll of paper partially (when a partial cut is indicated in the print job) or completely (when a full cut is indicated in the print job) based on the paper cutting operation contained in the print job. In another implementation, the finishing module 270 may have a fixed knife, a movable knife disposed substantially parallel to the fixed knife, a drive motor for driving the movable knife, and a position detection sensor for detecting the position of the movable knife.

The finishing device 220 comprises a finishing controller 280, which controls the finishing device 220 on the basis of information received from the printing device 210 via a signal line or information input from an operation panel associated with the finishing device 220. The finishing controller 280 may be used for interfacing the finishing device 220 with the printing device 210. In another implementation, the system may comprise a plurality of finishing devices, and the finishing controller 280 may be used for controlling one or more finishing devices.

In one implementation, the finishing controller 280 controls the finishing device 220 in accordance with a finishing command specified by the print job. For example, the finishing controller 280 controls a copying operation on the basis of the information input from the operation panel. Further, the finishing controller 280 controls a printing operation performed by the printing device 210 on the basis of image information and control information input by the printing controller 250. More specifically, the finishing controller 280 controls a signal generated by the finishing device 220 in response to the print job received from the user of the printing system 200. The finishing controller 280 may communicate the generated signal to the printing device 210, which initiates the printing process.

Communication protocol between the printing device 210 and the finishing device 220 may be executed over a standard Ethernet connection or any other suitable communication protocol. The communication protocol may address generic synchronization and status messages exchange. Before a print job starts, the printing device 210 may wait for a trigger from the finishing device 220 to start. Further, the communication protocol may be utilized to output error messages if errors are detected during printing and finishing processes.

In one implementation, the printing system 200 may comprise a notification module (not shown in FIG. 2) that outputs a report indicating the print medium was finished synchronized to the finishing operation of the finishing module 270. Moreover, the notification module may output a report with a different notification pattern according to the type of finishing command.

Figure 3:
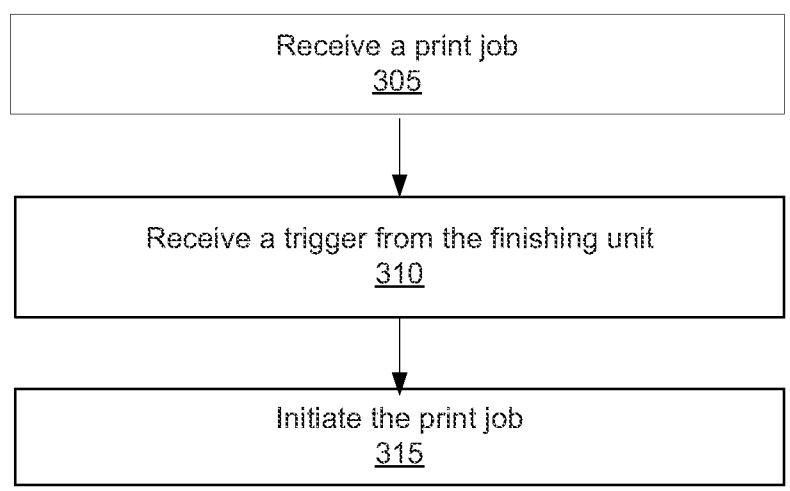
FIG. 3 illustrates an example process flow diagram in accordance with an implementation.

Turning now to the operation of the system 100, FIG. 3 illustrates an example process flow diagram 300 in accordance with an implementation. It should be readily apparent that the processes illustrated in FIG. 3 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with a system 100. Alternatively or in addition, the processes may represent functions and/or actions performed by functionally equivalent circuits like an analog circuit, a digital signal processor circuit, an application specific integrated circuit (ASIC), or other logic devices associated with the system 100. Furthermore, FIG. 3 is not intended to limit the implementation of the described implementations, but rather the figure illustrates functional information that could be used to design/fabricate circuits, generate software, or use a combination of hardware and software to perform the illustrated processes.

The process 300 may begin at block 305, where a request for a print job is received by the printing system from a user of the system. A print job in the context of the an implementation relates to a complete print task that includes the actual printing, which is carried out by a printing device, and one or multiple finishing operations, which are to be carried out by a finishing line devices. Print job instructions may be provided in Job Definition Format (JDF). The process of receiving the print job further involves the printing device receiving the job specification in the JDF communication and dividing the job specification command in to a series of printing device specific commands (typically also in JDF format or JMF—Job Messaging format, which is part of the JDF specification and is also typically built in XML). As discussed in more detail above with respect to FIG. 1, the user may submit the request for the print job through printing software. The user may be, e.g., a person such as an administrator of a computer and/or an automated machine capable of providing print job requests.

At block 310, the system receives a trigger from the finishing device. As part of the process, it may be determined whether the printing system is set to be externally triggered. In the event that the system is not set to be externally triggered, the printing system proceeds to initiate the print job without further communication with the finishing device. In the event that the system is set to be externally triggered, the system checks to see if the finishing device generates a trigger that is communicated to the printing device. In one implementation, the system may wait for a set period of time to receive a trigger from the finishing device. For example, the set period of time may be 10 seconds. In that example, if a trigger is not received from the finishing device in 10 seconds, the printing device proceeds to issue an error (e.g., timeout). Such error may be communicated to the user of the printing system via the user interface. In the event that the trigger is received in 10 seconds, the process continues to block 315 as shown in FIG. 3.

After receiving the generated trigger from the finishing device, at block 315, the system initiates the print job. In one implementation, a first part (e.g., first page, a first set length of printing element) of the print job may be printed, and the system waits to detect the trigger at the finishing device to proceed with a next part (e.g., the next page, the next set of length of printing element). In such an implementation, the software running in the printing device may require a trigger for each part (e.g., each page). In another implementation, the printing device may proceed with the entire print job after receiving the trigger and may not require any additional triggers from the finishing device to continue after the first part of the document.

It is then determined whether the print jobs are finished or whether there are more pending jobs. If there exists a new job the above steps are repeated for the next job, else the process terminates.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method for operating a printing system, comprising:
    receiving, at a printing unit, a print job;
    receiving, at the printing unit, a trigger generated by a finishing unit; and
    initiating the print job based on the generated trigger, wherein the trigger synchronizes the printing unit with the finishing unit by causing output of the print job to be aligned in a cycle of the finishing unit when the output of the print job is received at the finishing unit.

2. The method of claim 1, wherein initiating the print job based on the generated trigger further comprising comprises causing the printing unit to print at least a portion of the print job.

3. The method of claim 1, wherein initiating the print job based on the generated trigger further comprises performing an alignment correction of output of the print job by the printing unit.

4. The method of claim 1, wherein receiving the trigger generated by the finishing unit further comprises receiving the trigger in a predetermined amount of time.

5. The method of claim 4, wherein the printing unit issues an error message if the printing unit does not receive the trigger within the predetermined amount of time after receiving the print job.

6. The method of claim 1, wherein the printing unit receives the trigger cyclically.

7. The method of claim 1, wherein timing of the trigger received at the printing unit may be adjusted based on the cycle of the finishing unit.

8. The method of claim 7, wherein the finishing unit performs at least one finishing operation indicated in the print job, and wherein the cycle of the finishing unit is one loop of the at least one finishing operation.

9. The method of claim 8, wherein the trigger synchronizes by aligning a start of output from the printing unit with a starting location of the finishing operation by the finishing unit.

10. The method of claim 8, further comprising receiving user input to make the printing system externally triggered.

11. The method of claim 1, further comprising determining whether the printing system is externally triggered.

12. A printing system, comprising:
    a printing unit to receive a print job; and
    a controller to control input data generated in response to a trigger from a finishing unit communicatively coupled to the printing unit, the trigger initiating the print job at the printing unit, wherein the trigger synchronizes the printing unit with the finishing unit by causing output of the print job to be aligned in a cycle of the finishing unit when the output of the print job is received at the finishing unit.

13. The system of claim 12, wherein the amount of time the printing unit waits to receive the trigger after the print job is received is set by an input received from a user of the printing system.

14. The system of claim 12, wherein the controller gathers system information from the finishing unit.

15. The system of claim 14, wherein the system information identifies whether the system is externally triggered or not.

16. A printing system, comprising:
    a printing unit to receive a print job;
    the printing unit to receive a trigger generated by a finishing unit within a predetermined amount of time; and
    the printing unit to initiate the print job based on the generated trigger, wherein the trigger synchronizes the printing unit with the finishing unit by causing output of the print job to be aligned in a cycle of the finishing unit when the output of the print job is received at the finishing unit.

17. The system of claim 16, wherein the finishing unit is to store attributes related to the finishing unit in the printing unit.

18. The system of claim 16, wherein the finishing unit has a conversion module to generate the trigger and send the trigger to the printing unit.

* * * * *